United States Patent [19]

Jacobson

[11] Patent Number: 4,512,148
[45] Date of Patent: Apr. 23, 1985

[54] INTERFACE FOR WATER COOLED ENGINE MANIFOLDS

[76] Inventor: Clayton J. Jacobson, P.O. Box 5338, Empire Landing RB, Parker, Ariz. 85344

[21] Appl. No.: 510,766

[22] Filed: Jul. 5, 1983

[51] Int. Cl.³ ............................ F01N 7/06; F01N 7/18
[52] U.S. Cl. .......................................... 60/321; 60/322; 60/323; 285/41; 285/158; 285/174; 285/253
[58] Field of Search ......................... 60/321, 322, 323; 285/24, 41, 158, 165, 174, 236, 253

[56] References Cited

U.S. PATENT DOCUMENTS

| | | | |
|---|---|---|---|
| 2,460,984 | 2/1949 | Hill | 285/158 |
| 2,840,350 | 6/1958 | Pierce | 285/41 |
| 3,206,836 | 9/1965 | Schlussler | 60/321 |
| 3,798,904 | 3/1974 | Gleason | 285/41 |
| 3,850,453 | 11/1974 | Bentley | 60/322 |
| 4,039,212 | 8/1977 | Skarud | 285/253 |
| 4,194,460 | 3/1980 | Sato | 285/41 |
| 4,249,758 | 2/1981 | Harris | 285/174 |

FOREIGN PATENT DOCUMENTS 369594 3/1939 Italy ........................................ 60/321

Primary Examiner—Douglas Hart
Attorney, Agent, or Firm—Michael Bak-Boychuk

[57] ABSTRACT

An adapter for isolating vibration and thermal shock incident to the use of water cooled manifolds attached to internal combustion engines comprises a substantially annular resilient flange conformed to receive the water cooling jacket of a manifold in one side thereof and adapted for attachment at the other side to the exhaust ports of an internal combustion engine. The water jacket around the manifold is provided with a sealing peripheral bead which opposes the compression of the hose clamp surrounding the annulus of the adapter. The adapter, furthermore, includes an attachment flange enclosing on the interior thereof an annular stiffener plate through which attachment may be made to the engine. The internal combustion engine includes water cooling cavities around the exhaust ports thereof and contacting surfaces of the adapter are thus constantly cooled, allowing for the use of low temperature materials like neoprene or the like.

4 Claims, 3 Drawing Figures

INTERFACE FOR WATER COOLED ENGINE MANIFOLDS

BACKGROUND OF THE INVENTION

1. Field of the Invention

The present invention relates to sealing devices, and more particularly to flanges for attaching manifolds to an internal combustion engine.

2. Description of the Prior Art

The use of water jacketed manifolds for confining the passage of exhaust gases in an internal combustion engine have been known in the past. Such use most frequently is practiced with marine engine installations where cooling water is conveniently available and where engine compartment temperatures are frequently a potential hazard. While the cooling benefits of a jacketed manifold are well known in the art it is also well known that such manifolds are prone to failure because of vibration stresses, thermal stress, or a combination of both. The typical technique heretofore practiced in the art entails a hard connection between the manifold and the exhaust side of the engine. This attachment transfers vibration to the exhaust manifold which therefore fails due to fatigue and heat. Further, it is sometimes desired to inject water into the exhaust stream to lower the temperature of the gases prior to any flexible hose connection leading away from the engine. This results in frequent problems when the water finds its way back to the engine interior.

Accordingly, techniques for relieving stress concentration and fatigue have been sought in the past and it is this problem that is addressed herein.

SUMMARY OF THE INVENTION

Accordingly, it is the general purpose and object of the present invention to provide a manifold to engine interface which effectively decouples the motion of the manifold from that of the engine while sealing off exhaust gases.

Other objects of the invention are to provide an interface configuration between a water cooled manifold and an internal combustion engine conformed for engagement through a resilient adapter.

Yet additional objects of the invention are to provide a resilient manifold adapter which by virtue of its configuration makes intimate contact with manifold and engine surfaces cooled by water jackets.

A further object of the present invention is to make use of a smaller, lighter and far more efficient exhaust system of the expansion type which may be used without water injection.

Briefly, these and other objects are accomplished within the present invention by providing a substantially annular manifold adapter structure having a central cavity conformed for intimate contact with the exterior periphery of the water jacket around the cooled manifold. The other mating surface of the adapter makes intimate contact with the water jacket around the internal combustion engine, thus having both contacting surfaces cooled by water. In this manner the adapter may be made of any resilient material such as neoprene; the thermal levels encountered being limited by the coolant.

To provide for convenient technique for attachment of the adapter to the manifold exterior surfaces, the manifold jacket is shaped to include a sealing bead which is receivable on the interior of the adapter cavity. This bead, when properly received, aligns subjacent a peripheral recess into which a hose clamp or similar securing device may be inserted. The other surface of the adapter may be expanded to form a flange, once again comprising the resilient material structure and including on the interior thereof an encapsulated flange plate for distributing the fastener load. It is through this surface that intimate contact is made with the exhaust side of the engine; the normally available studs passing through the flange plate to secure the adapter.

Thus both the intimately contacting surfaces of this adapter engage areas cooled by water and in this manner the temperature level at the joints may be maintained below the melting or burning level of the resilient compound. Accordingly, material structures heretofore unacceptable for exhaust manifold applications may be used to advantage pursuant to the teachings herein.

DESCRIPTION OF THE SPECIFIC EMBODIMENT

Figure 1:
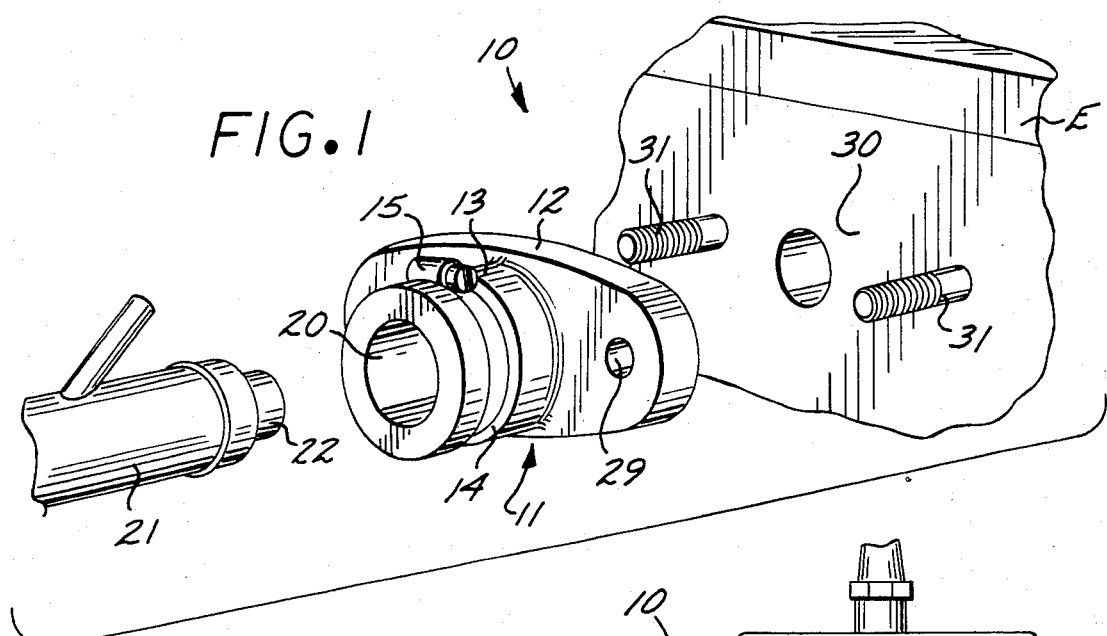
FIG. 1 is a perspective illustration, separated by parts, of an inventive interface between a water cooled exhaust manifold and an internal combustion engine.
Figure 2:
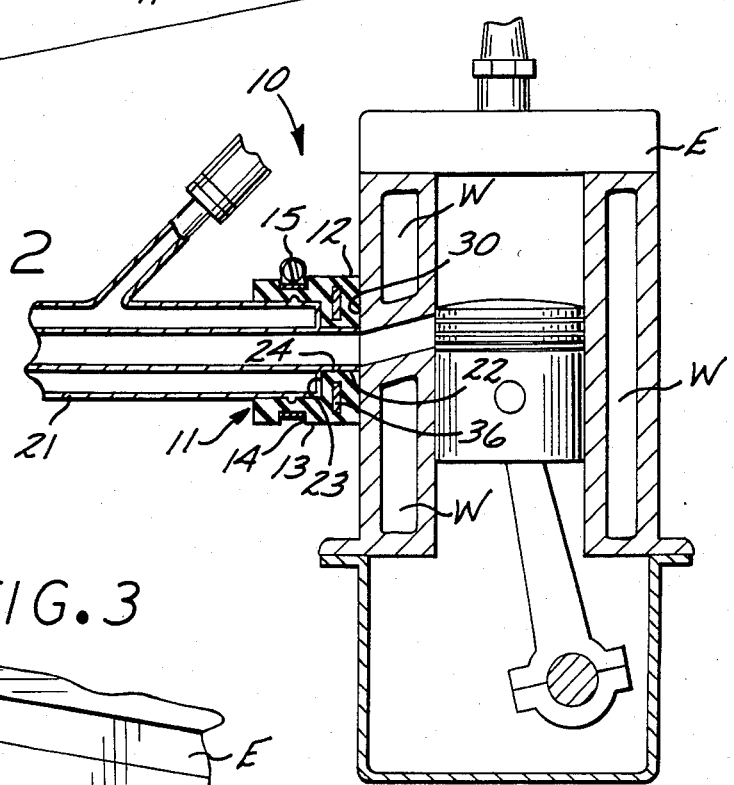
FIG. 2 is a sectional side view of an internal combustion engine mated to a water cooled manifold across the inventive interface.

As shown in FIGS. 1 and 2 the inventive exhaust manifold interface, generally designated by the numeral 10, comprises a resilient adapter 11 generally conformed as a surface abutting flange 12 having extending from one side thereof an annular boss 13 which includes around the periphery thereof a groove 14 into which a hose clamp 15 is received. Boss 13 is provided with a central cavity 20 conformed to receive a cylindrical end of a water jacket 21 surrounding an exhaust pipe 22. The water jacket end 21 only partly covers the exhaust pipe 22, exposing the end thereof and for that reason the internal configuration of cavity 20 is provided with a shoulder 23 to a reduced section 24. This shoulder configuration of cavity 20 is dimensioned to receive in conforming fit the end of the exhaust pipe 22 and the corresponding end of the water jacket 21, bringing the end of the exhaust pipe 22 into proximate alignment with the exterior surface of the flange 12. In this configuration the flange 12, being provided with the appropriate fastener holes 29, is mounted onto the exhaust side of an engine E, shown as the exhaust surface 30. As is commonly practiced in the art, surface 30 is provided with the appropriate fastening studs 31 aligned to pass through the holes or openings 29 and threadably engaging securing nuts thereon. Once again, according to the common practice in the art, the exhaust side or surface 30 of the engine E is formed as a wall of a water jacket W and therefore the surface temperatures thereof are limited by the heat of vaporization of the cooling fluid.

Accordingly, both surfaces contiguously abutting the adapter 11 are surfaces containing cooling fluid. The adapter can therefore be formed of any resilient material structure having a melting point just slightly higher than the maximum coolant temperature. In this form the structural benefits of a material like neoprene can be used to best advantage, providing the necessary attenuation of vibration and thermal shock normally entailed in manifold structures.

To further improve the sealing configuration of the above-described adapter, the cooling jacket end 21 may be provided with a peripheral bead 35 which, upon insertion into the adapter, will align subjacent the recess or groove 14 and is thus directly opposite to the hose clamp 14. Similarly, a reinforcing plate 36 may be included within the structure of the flange 12 and it is through this reinforcing plate 36 that compression can be distributed to insure an even sealing contact with the exhaust surface 30.

Figure 3:
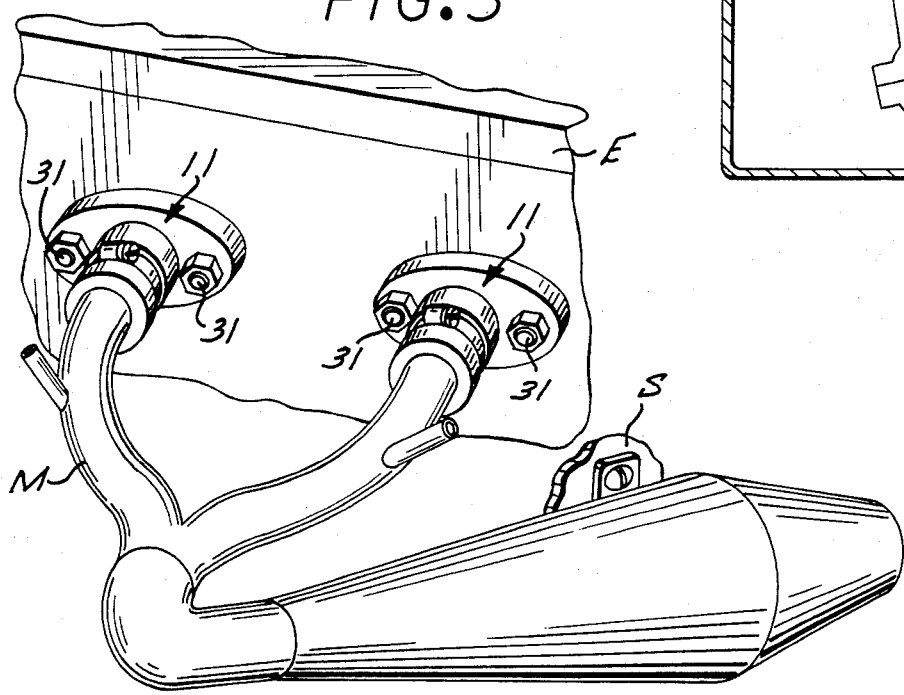
FIG. 3 is yet another perspective illustration of a manifold configuration secured to an engine according to the invention herein.

By reference to FIG. 3 the foregoing interface configuration may be adapted to a manifold structure each adapter interfacing one exhaust connection of the manifold. This manifold, shown as manifold M, may then be structurally engaged to any structural member of the vehicle S with the adapters 11 attenuating any differentials between the vibrational modes of the engine E and the vehicle structure.

Some of the many advantages of the present invention should now be readily apparent. As set out herein the invention provides a convenient technique for isolating the various modes of an exhaust manifold which is typically cantelevered off the side of an engine. This the invention provides in a device which is easy to produce and which requires minimal tooling effort in the course of assembly.

Obviously many modifications and changes may be made to the foregoing description without departing from the spirit of the invention. It is therefore intended that the scope of the invention be determined solely on the claims appended hereto.

What is claimed is:

1. In an internal combustion engine provided with exhaust ports for venting the products of combustion and a hollow jacket for containing coolant around said exhaust ports, the improvement comprising:
   an exhaust manifold provided with mating ends adapted to mate with respective ones of said exhaust ports including cavities formed around the exterior thereof for containing coolant, said cavities terminating proximate said mating ends;
   a plurality of resilient adapters each conformed as an annular structure for sealably receiving the exterior surface of said cavities around said mating ends and for sealably engaging said engine around said exhaust ports; and
   each of said adapters includes a cylindrical boss provided with a central opening conformed to receive one of said mating ends, said boss expanding to form a flange adapted to abut said engine.
2. Apparatus according to Claim 1 wherein:
   said flange is provided with a rigid stiffener disposed on the interior thereof.
3. Apparatus according to Claim 1 wherein:
   said boss is provided with a peripheral groove around the exterior thereof;
   said exterior surface of said cavities about said mating ends is provided with a peripheral bead aligned for receipt in said opening subjacent said groove; and
   clamping means received in said groove for clamping said boss against said peripheral bead.
4. Apparatus according to claim 1 wherein:
   said adapter includes a cylindrical boss provided with a central opening conformed to receive said mating end, said boss expanding to form a flange adapted to abut said engine.

* * * * *